US011439484B2

(12) United States Patent
Rohner et al.

(10) Patent No.: US 11,439,484 B2
(45) Date of Patent: Sep. 13, 2022

(54) METHOD FOR CONTROLLING A MACHINE TOOL

(71) Applicant: Ivoclar Vivadent AG, Schaan (LI)

(72) Inventors: Gottfried Rohner, Altstätten (CH); Christian Seiler, Zürich (CH)

(73) Assignee: Ivoclar Vivadent AG, Schaan (LI)

(*) Notice: Subject to any disclaimer, the term of this patent is extended or adjusted under 35 U.S.C. 154(b) by 427 days.

(21) Appl. No.: 16/472,541

(22) PCT Filed: Mar. 17, 2017

(86) PCT No.: PCT/EP2017/056413
§ 371 (c)(1),
(2) Date: Jun. 21, 2019

(87) PCT Pub. No.: WO2018/130313
PCT Pub. Date: Jul. 19, 2018

(65) Prior Publication Data
US 2021/0077232 A1 Mar. 18, 2021

(30) Foreign Application Priority Data

Jan. 10, 2017 (EP) ..................................... 17150786

(51) Int. Cl.
*A61C 13/00* (2006.01)
(52) U.S. Cl.
CPC ...... *A61C 13/0004* (2013.01); *A61C 13/0006* (2013.01); *A61C 13/0022* (2013.01)
(58) Field of Classification Search
CPC . B23Q 17/24; A61C 13/0004; A61C 13/0006; A61C 13/0022
See application file for complete search history.

(56) References Cited

U.S. PATENT DOCUMENTS

| 4,403,860 A | * | 9/1983 | Pryor | ..................... G01B 11/00 |
| | | | | 33/542 |
| 4,941,106 A | * | 7/1990 | Krieger | .................. B23Q 17/24 |
| | | | | 318/568.16 |

(Continued)

FOREIGN PATENT DOCUMENTS

| CN | 107598676 A | 1/2018 |
| DE | 102008035305 A1 * | 2/2009 ............. B23Q 17/24 |

(Continued)

*Primary Examiner* — Jacob J Cigna
(74) *Attorney, Agent, or Firm* — Ann M. Knab; Thad McMurray

(57) ABSTRACT

The invention relates to a system of a method for controlling a machine tool, and a workpiece, in particular a milling blank, and the method for machining this workpiece, said machine tool comprising a robot arm movable in at least 2, in particular at least 3 spatial axes in a range of motion, said robot arm carrying, guiding and moving at least one workpiece, possibly by means of a workpiece holder, with a control unit for controlling the machine tool. The machine tool (62) comprises a sensor, in particular a spatially fixed optical sensor or is assigned said sensor, whose detection range (66) at least partially overlaps the range of motion. The workpiece (10) comprises a change in geometry, in particular a hole (12), is moved in the detection range (66) by the robot arm (70), and upon detection of the hole (12) by the sensor the control unit determines a reference point, reference axis and/or reference surface for controlling the machine tool (62).

20 Claims, 5 Drawing Sheets

(56) References Cited

U.S. PATENT DOCUMENTS

| | | | | |
|---|---|---|---|---|
| 5,771,309 | A | * | 6/1998 | Yamaoka .............. G01B 11/002 348/94 |
| 6,723,951 | B1 | * | 4/2004 | McGraw ................ B23K 26/04 219/121.71 |
| 7,178,731 | B2 | | 2/2007 | Basler |
| 7,993,019 | B2 | * | 8/2011 | Barker .................. B23Q 17/24 83/365 |
| 8,295,585 | B2 | * | 10/2012 | Wienand ................ G01S 5/163 382/151 |
| 8,893,387 | B2 | | 11/2014 | Basler |
| 9,942,524 | B2 | * | 4/2018 | Kranitzky ............. H04N 7/183 |
| 10,191,460 | B2 | * | 1/2019 | Kawai .................... G06F 3/147 |
| 10,591,289 | B2 | * | 3/2020 | McLean ................ G01B 11/24 |
| 2002/0181760 | A1 | * | 12/2002 | Asai ........................ G06T 7/001 382/149 |
| 2005/0222705 | A1 | * | 10/2005 | Budd ................ B23Q 17/0909 700/175 |
| 2006/0035776 | A1 | * | 2/2006 | Duncan .................. B23C 1/045 483/30 |
| 2006/0192978 | A1 | * | 8/2006 | Laguarta Bertran ....................... G01B 11/2518 356/601 |
| 2007/0050089 | A1 | | 3/2007 | Sun et al. |
| 2007/0111640 | A1 | | 5/2007 | Bem et al. |
| 2007/0276629 | A1 | * | 11/2007 | Koonankeil ............ F01D 5/005 702/185 |
| 2009/0055024 | A1 | * | 2/2009 | Kay ...................... B25J 9/1697 700/259 |
| 2010/0274390 | A1 | * | 10/2010 | Walser .................. B25J 9/1697 700/259 |
| 2012/0072021 | A1 | | 3/2012 | Walser et al. |
| 2012/0072170 | A1 | * | 3/2012 | McKendrick ........ G01B 11/005 702/150 |
| 2012/0324731 | A1 | * | 12/2012 | Gagnon ............. A61C 13/0004 29/896.1 |
| 2013/0128285 | A1 | * | 5/2013 | Khajornrungruang ...................... B23Q 17/2233 356/634 |
| 2013/0278751 | A1 | * | 10/2013 | Kranitzky ................ G06T 7/75 348/94 |
| 2016/0291585 | A1 | * | 10/2016 | Leeson ............ G05B 19/40937 |
| 2017/0031345 | A1 | * | 2/2017 | Ono ...................... G05B 19/409 |
| 2017/0160077 | A1 | * | 6/2017 | Featherstone ...... G01B 11/2433 |
| 2018/0156608 | A1 | * | 6/2018 | McLean ................ G06T 7/0004 |
| 2019/0152064 | A1 | * | 5/2019 | Schnos ................ B25J 9/1697 |
| 2019/0192256 | A1 | * | 6/2019 | Huber ................ B23Q 17/2241 |
| 2019/0332085 | A1 | * | 10/2019 | Huber ................ B23Q 3/15546 |
| 2019/0351504 | A1 | * | 11/2019 | Reisacher .......... B23K 26/0006 |
| 2021/0053169 | A1 | * | 2/2021 | Benzinger .......... A61C 13/0004 |

FOREIGN PATENT DOCUMENTS

| | | |
|---|---|---|
| EP | 2570236 A1 | 3/2013 |
| JP | 2002137149 A | 5/2002 |
| WO | 2009141184 A1 | 11/2009 |

* cited by examiner

METHOD FOR CONTROLLING A MACHINE TOOL

CROSS-REFERENCE TO RELATED APPLICATIONS

This application is a National Stage application of International patent application No. PCT/EP2017/056413 filed on Mar. 17, 2017, which claims priority to European patent application No. 17150786.6 filed on Jan. 10, 2017, all the disclosures of which are incorporated herein by reference in their entirety.

FIELD OF THE INVENTION

The invention relates to a system of a method for controlling a machine tool and a workpiece, in particular a milling blank, and the method of machining this workpiece, in accordance with the preamble of claims 1 and 14.

BACKGROUND

A system of this kind may be taken, for instance, from US 2007/111,640 A1. Here, the milling machine comprises a camera which is attached in a spatially fixed manner. It is attached above a tool and comprises a detection range which faces a tool. The camera is to detect the state of the tip of the tool.

In particular in case of milling machines comprising a robot arm which is movable in four or five spatial axes and combining this robot arm with a fixed tool spindle, it is required to establish the position of the workpiece to be taken as a basis, respectively, relative to the tool. It has been suggested, for instance, to cause the robot arm and the tool clamped therein to carefully approach the spindle. The contact and the machining process cause the machine current of the spindle motor to rise such that determination may be made on this basis if contact has been made.

However, this solution is comparatively inaccurate and requires to produce a certain amount of abrasion which entails further inaccuracy.

Machine tools of today, in particular milling machines but also lathe-milling machines, grinding machines and drilling machines for the dental industry, must be able to handle also different workpieces. They must be machined partly with different programs, but partly also with different tools.

For this purpose, it has been suggested to enable assignment between the respective workpiece and the associated program by means of identification means. However, different workpieces also require different tools such that user intervention would still be required for changing the tool.

SUMMARY

In contrast, the invention is based on the task of providing a system of a method for controlling a machine tool and a workpiece, in particular a milling blank, and the method of machining this workpiece in accordance with the preamble of claims 1 and 14, respectively, which is further improved with regard to the disadvantages of the prior art.

This task is inventively solved by claims 1 and 14, respectively. Advantageous developments may be taken from the subclaims.

The inventive solution according to claim 1 is initially characterized in that a sensor, in particular a spatially fixed optical sensor, comprises a detection range which overlaps the range of motion of the workpiece, which is clamped in the robot arm, namely at least partially. In this way, the camera provided respectively is able to detect the movement of the workpiece.

In this embodiment, the workpiece comprises a hole, and the hole is moved laterally preferably orthogonally with respect to the sensor, for instance a camera. The axis of detection of a camera, that is to say the optical axis, detects if the edge of the hole is under the axis. Preferably, the hole has a sharp edge and extends at an angle of 90° with an angular deviation of less than 1° with respect to the surface in which it is configured. If a camera is used, the result is a sharp light/dark transition, and the exact position of the beginning of the hole in the direction of movement of the robot arm may be determined in this way.

Preferably, the robot arm is guided subsequent to this at an angle of 90° relative to the existing direction of movement, namely such that the hole is guided through the axis again.

The two directions may be referred to as X-direction and Y-direction.

The diameter of the hole is known such that the robot arm carries out lateral displacement by the radius of the hole, and the path of movement is selected such that the sensor axis also passes through the axis of the hole in the course of the movement.

Now, a mathematical operation of both paths of detection makes possible to exactly determine the center of the hole, that is to say the axis of the hole.

This value is determined as the reference point in the direction X/Y, and for the machining process, that is to say, for instance, the milling process, a transformation of coordinates is performed on the also known position of the tool in the tool spindle.

The workpiece may be for instance a dental milling blank. For the production of an abutment it is required to realize a respective hole such that the system according to claim 1 is particularly suited for the production of an abutment. Then, the abutment is produced by milling around the hole, namely inventively particularly advantageously with high accuracy, as the alignment and arrangement of the hole in the milling blank is detected inventively and thus milling may be performed such that the desired equal wall thicknesses and a substantially symmetrical configuration of the abutment are possible.

It is to be understood that it is not excluded according to the invention that the abutment comprises a rotation lock. It may be realized both on the inside and on the outside, wherein, on the other hand, when the rotation lock is realized as a land in the hole protruding towards the inside, the measurement is performed preferably such that the movement path does not pass straight through the rotation lock.

When the workpiece is configured as a cuboid in which case the movement paths extend perpendicularly relative to the surfaces of the cuboid, a respective rotation lock may be attached in that case, for instance, at an angle of 45° relative to these directions, wherein it is ensured in this way that none of the movement paths relate to the rotation lock.

When the workpieces are realized from presintered dental ceramics, the surfaces, for instance of the substantially cuboid workpiece, are typically not exactly planar. This holds true in particular if the workpiece is present in presintered form as lithium metasilicate. For instance, the edges of the workpiece are then also rounded.

In a particular configuration of the invention it is provided that at least one of the surfaces of the workpiece is milled to be planar in advance without further ado. In this way, a sharp edge can be produced with respect to at least one further surface perpendicular thereto. It is substantially better suited for the provision of a light/dark transition and thus for an exact determination than a slightly rounded surface, or a surface which merges into another cuboid surface via a radius.

According to the invention, it is thus provided to initially provide an initial milling process with at least one or at least two surfaces adjacent to one another, and to then move the workpiece through the detection range of the sensor with the aim of identifying the sharp edge produced in this way, and using it as a reference surface.

This solution is also suited for workpieces which do not have a hole.

According to this solution, the detection range must also at least partially overlap the range of motion, and the workpiece with a pre-produced planar surface and its edge with respect to another surface is moved into the detection range by the robot arm. Upon detection of the edge, the sensor supplies the respective sensor signal to the control unit which determines the reference point, reference axis and/or reference surface for controlling the machine tool on this basis.

It is to be understood that preferably the workpiece and the machine tool altogether have coordinates which are orthogonal to one another and which are particularly suited when substantially cuboid-shaped workpieces are to be machined. However, when disc-shaped workpieces are machined, at least partially polar coordinate systems may also be used instead.

The inventive system according to claim 14 is also particularly suited to realize an assignment between the workpiece and the required machining process. For this purpose, the camera which configures the sensor may be used directly to identify the workpiece by means of a code attached thereat. Further, the tool may also have a respective code, preferably at its shaft which is guided by the robot arm and which is exposed thereat, that is to say visible to the camera.

In this advantageous configuration the camera may detect what type of workpiece it is. The identification feature determined for instance by a data matrix code is supplied to the control unit. Then, the control unit determines according to which milling process the workpiece is to be milled. Further, a suitable tool is selected wherein, in turn, identification of the tool is carried out by means of the code, for instance a two-dimensional code 128, attached to the shaft.

The invention is particularly suitable for dental milling machines, in particular of a type having a distribution of axes of 5/0, that is to say a fixed milling spindle and a robot arm movable in 5 axes. Then, its machine zero may be calibrated particularly well by means of the detection using the camera; by contrast, the position of the tool at the spindle is fixed.

BRIEF DESCRIPTION OF THE DRAWINGS

Further advantages, details and features may be taken from the following description of several exemplary embodiments in conjunction with the drawings, in which.

DETAILED DESCRIPTION

Figure 1:
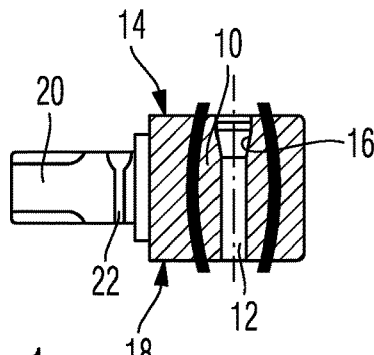
FIG. 1 shows a section through a workpiece, as may be used in an inventive system, which is attached to a holder, in a first embodiment.

The workpiece 10 illustrated in FIG. 1 comprises a hole 12 which extends transversely through the workpiece. A cone 16 of the hole is provided adjacent to an upper surface 14. In contrast, the hole 12 at the lower surface 18 is free from a cone.

In the exemplary embodiment illustrated, the workpiece 10 consists of dental ceramics and is attached to a holder 20. The holder 20 serves to clamp it fixedly into a robot arm which is apparent, for instance, from FIG. 8.

The holder 20 comprises a lateral slot 22 which is intended to receive the workpiece 10 in a workpiece magazine.

Figure 2:
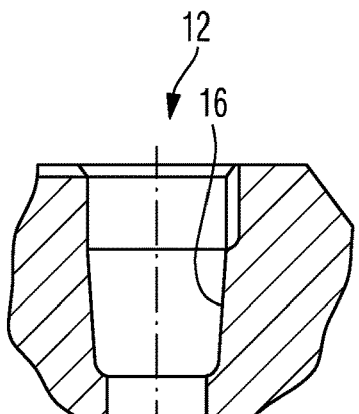
FIG. 2 shows an enlarged illustration of a detail from FIG. 1.

It is apparent from FIG. 2 how the cone 16 may be configured. In the exemplary embodiment illustrated, the cone angle amounts to between three and five degrees. When the movement path of the robot arm is selected such that the sensor detects the surface 14 and the hole extending to the bottom therefrom, a gradual light/dark transition takes place due to the cone 16.

Thus, it is preferred that the surface 18 is turned towards the sensor. This is possible without further ado by correspondingly controlling the robot arm. There, the hole 12 is sharp-edged and thus produces a sharp light/dark transition.

Figure 3:
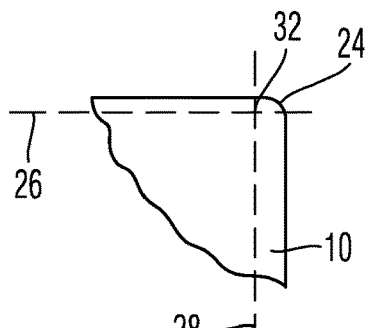
FIG. 3 shows a partial illustration of another embodiment of a workpiece.

It is apparent from FIG. 3 that the workpiece 10 is initially provided with round edges 24 in a modified configuration. In order to detect the position or else generate a reference point material is removed along the lines 26 and 28 by means of the milling spindle preferably provided in a spatially fixed manner without further ado. Then, there are planar surfaces at the lines 26 and 28, respectively, and a sharp edge 32 is produced which may be used for determining the reference point.

Preferably, a further planar surface is produced orthogonal to these surfaces, and further detection by means of the inventive sensor is carried out. As a result, reference points in several dimensions are known for the workpiece, and machining of the workpiece may be controlled precisely based hereon by respective transformation of coordinates.

Figure 4:
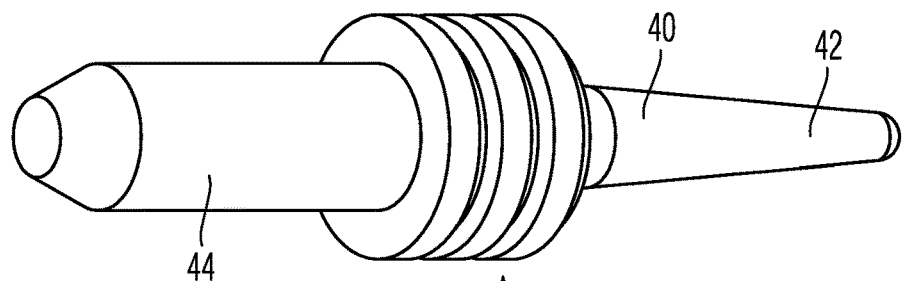
FIG. 4 shows a perspective view of a tool.

A tool illustrated in FIG. 4 is suitable for the inventive system. The tool 40 comprises a work portion 42 which may be diamond-tipped for instance. A shaft 44 of the tool is provided at the opposite end. In between, the tool 40 carries a ring 46 with two radial grooves 48 and 50 adjacent to one another. They are intended to be held at a mount of the robot arm or a corresponding gripper. This is apparent from FIG. 8, from which figure it is also apparent that in this position the shaft 44 of the tool 40 is exposed.

Figure 5:
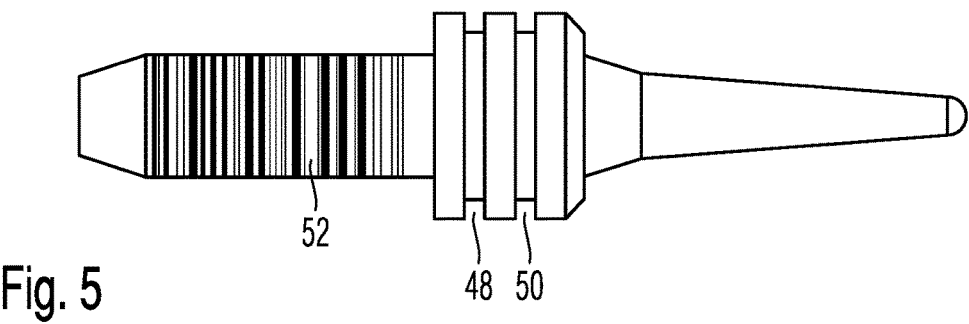
FIG. 5 shows a side view of an inventive tool.
Figure 10:
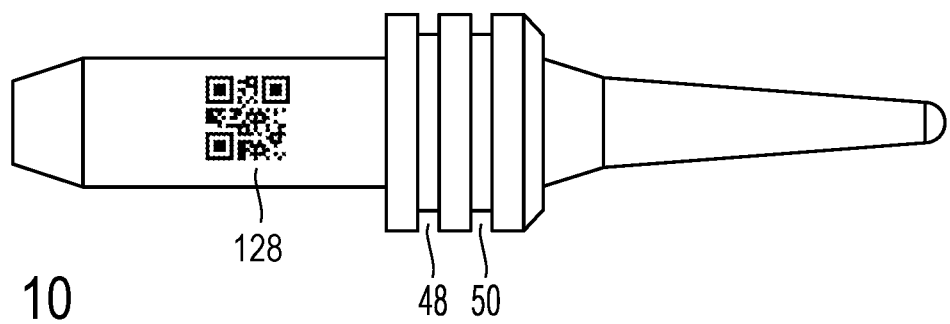
FIG. 10 shows a side of an inventive tool.

According to FIG. 5, the shaft 44 is provided with a code 52, preferably a code 128, as depicted in FIG. 10.

When they are positioned correspondingly, the sensor or the camera may then detect and identify the code and thus the respective tool.

Figure 6:
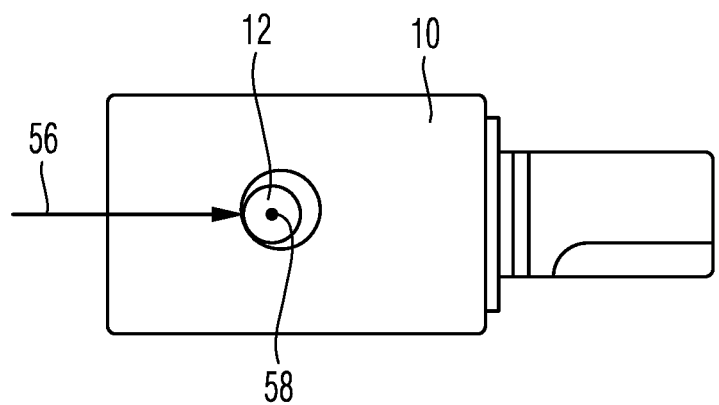
FIG. 6 shows a further embodiment of an inventive workpiece with an indicated path of movement.

From FIG. 6 a possible movement path 56 of the workpiece clamped at the robot arm is apparent. The workpiece is guided such that a sharp-edged part of the hole 12 passes through below the sensor or else in front of the sensor, and at the same time the movement path 56 is set to intersect also the axis of the hole 58.

Figure 7:
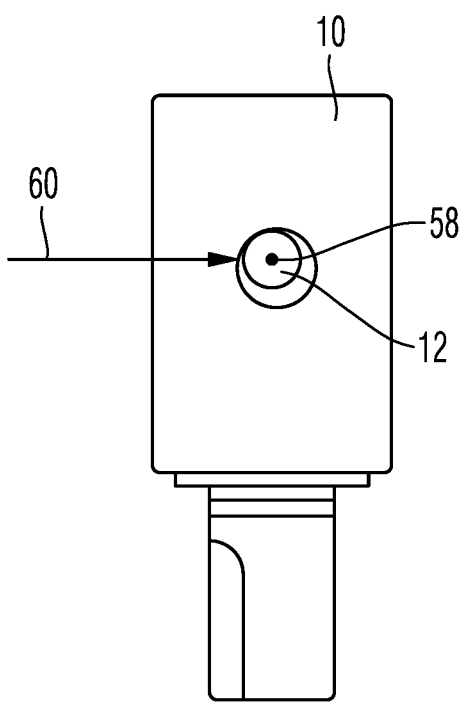
FIG. 7 shows the workpiece according to FIG. 6 and the other provided path of movement.

In a second step according to FIG. 7, a movement path 60 is realized at right angles to the movement path 56. Here, too, the movement path passes through the axis of the hole 58 and it is given attention to the fact that a sharp edge of the hole is present when the hole comes close to the axis of the sensor.

Figure 8:
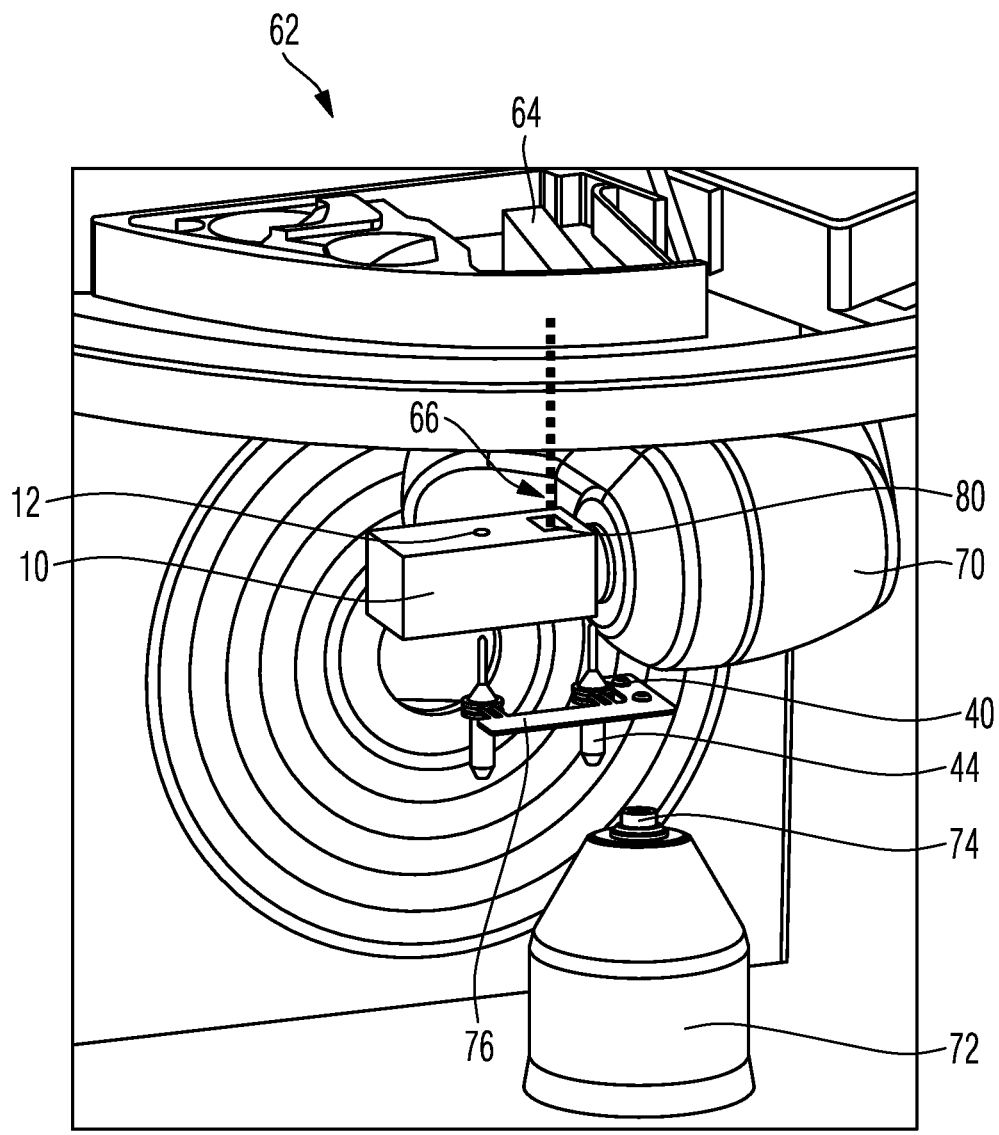
FIG. 8 shows a perspective view of an inventive system.
Figure 11:
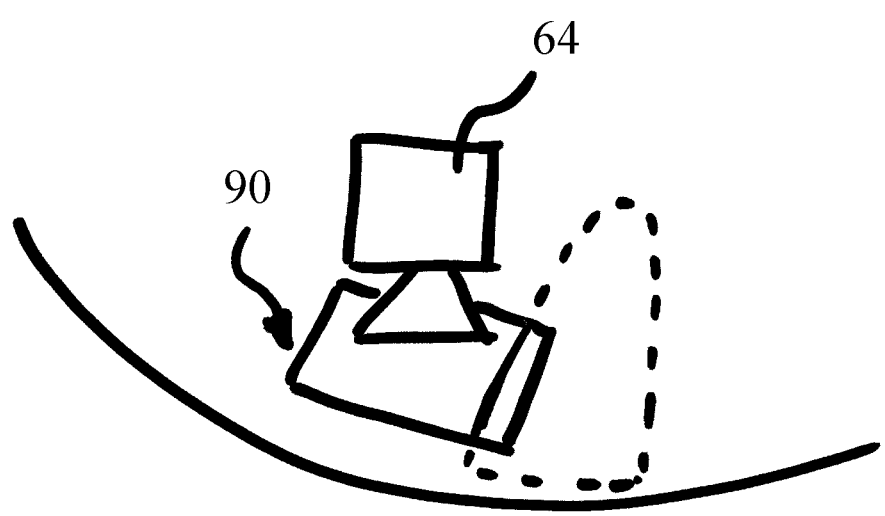
FIG. 11 shows a sectional view of the camera and an openable door of the inventive system.

A possible basic configuration of an inventive machine tool 62 is apparent from FIG. 8. A camera 64 is attached in a spatially fixed manner above a milling space and separated therefrom by a door 90 illustrated in FIG. 11. The door opening does not impede the detection range 66 of the camera.

A robot arm 70 is provided which holds the workpiece 10 clamped by the holder not illustrated. In this embodiment, too, the workpiece comprises a hole 12 and the robot arm 70 is moved such that the hole 12 passes through the detection range 66 and the associated optical axis of the camera 64.

This takes place in two dimensions in the horizontal direction, that is to say in the X-direction and in the Y-direction.

A tool spindle 72 is apparent below the robot arm 70. It is intended to hold clamped a tool 40 by means of a chuck 74. For this purpose, the robot arm 70 inserts the tool with its shaft 44 into the chuck 74 which clamps it thereat. For this purpose, the robot arm 70 comprises two mounts 76 for tools 40. They may be inserted into the chuck 74 selectively.

The mounts 76 are basically U-shaped and engage in the radial grooves 48 or 50 (see FIG. 5). A mounting of this type causes the shaft 44 of the respective tool to be exposed, respectively. The robot arm 70 is configured in a five-axis manner and is able to rotate the mounts 76 such that the shaft 44 is in the detection range 66. In this position, the camera 64 may read the code attached thereat and supply it to the control unit not illustrated to identify the tool.

Further, in the exemplary embodiment illustrated, the workpiece 10 comprises a further code 80 which is also readable by the camera 64 and suppliable to the control unit. On that basis, identification of the respective workpiece 10 is also possible, and then also selection of the desired milling program.

Figure 9:
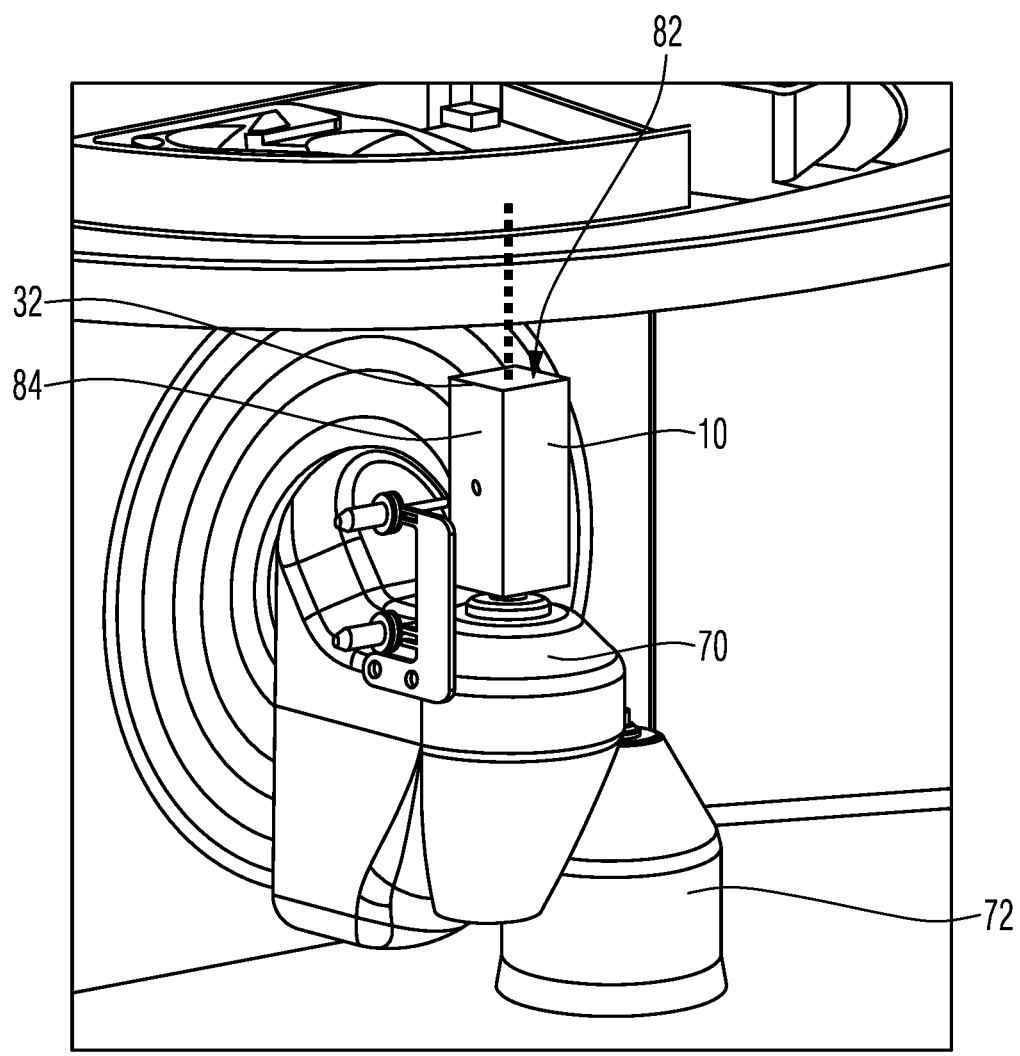
FIG. 9 shows the system according to FIG. 8 in another position of the robot arm.

A further possible position of the robot arm 70 is apparent from FIG. 9. This position is assumed for instance if the surfaces 82 and 84 of the workpiece 10 are milled to be planar by the tool spindle 72. Then, the robot arm is moved horizontally until the edge 32 between the surfaces 82 and 84 is identified, and the respective detected position is used as a reference point for the milling process of the workpiece 10 which is to be performed later.

The invention claimed is:

1. A system for controlling a machine tool and a workpiece and for machining the workpiece, comprising
a machine tool,
a workpiece, and
a control unit for controlling the machine tool,
said machine tool comprising a robot arm movable in at least 2 spatial axes in a range of motion,
said robot arm configured for carrying, guiding and moving at least one workpiece,
wherein the machine tool (62) comprises a fixed sensor or is assigned said fixed sensor,
wherein a detection range (66) of the fixed sensor at least partially overlaps the range of motion of the workpiece,
wherein an exchangeable tool (40) or the workpiece (10) comprises a code (52),
wherein the workpiece (10) is movable in the detection range (66) by the robot arm (70), and
wherein upon detection of the code (52) by the fixed sensor, the control unit is configured to carry out identification of the workpiece (10) and/or the tool (40) for controlling the machine tool (62) to perform a machining process adapted to an identity of the workpiece (10) and/or the tool (40).

2. The system as claimed in claim 1,
wherein the machine tool (62) is configured to machine a surface (14) of the workpiece (10) to be planar, which workpiece is fabricated of ceramics, and
wherein the robot arm (70) is configured to align the surface (14) substantially parallel to an axis of the detection range (66) of the fixed sensor, and
wherein the robot arm (70) is configured to move the workpiece (10) past the fixed sensor through the detection range (66) to detect an edge between the surface (14) and an adjacent surface.

3. The system as claimed in claim 1,
wherein the workpiece comprises a milling blank, and
wherein the fixed sensor comprises a spatially fixed optical sensor.

4. The system as claimed in claim 1,
wherein the tool (40) is mounted to a gripper or a mount (76) of the robot arm (70) and
wherein a tool shaft (44) extends in the detection range (66) of the fixed sensor.

5. The system as claimed in claim 4,
wherein the shaft (44) of the tool (40) is provided with a one-dimensional code (52), which is supplied to the control unit by the fixed sensor to identify the tool (40).

6. A system for controlling a machine tool and a workpiece and for machining the workpiece, comprising
a machine tool,
a workpiece,
a control unit for controlling the machine tool,
said machine tool comprising a robot arm movable in at least 2 spatial axes in a range of motion,
said robot arm configured for carrying, guiding and moving at least one workpiece,
wherein the machine tool (62) comprises a sensor or is assigned said sensor having a detection range (66) at least partially overlapping a range of motion of the workpiece,
wherein the sensor is fixed to a housing of the machine tool,
wherein the workpiece (10) comprises a hole (12) that is adapted to move laterally or orthogonally with respect to the fixed sensor,
wherein the workpiece (10) is movable in the detection range (66) by the robot arm (70), and
wherein upon detection of the surface or section having the hole, the control unit is configured to determine a reference point, reference axis and/or reference surface for controlling the machine tool (62).

7. The system as claimed in claim 6,
wherein the surface (14) of the workpiece (10) which comprises the hole (12) is machinable before detection of the hole (12), to produce a planar surface at the surface (14) comprising the hole.

8. The system as claimed in claim 6,
wherein the robot arm (70) is configured to align the hole (12) of the workpiece (10) during detection parallel to an axis of detection of the fixed sensor, wherein the fixed sensor is a camera (64).

9. The system as claimed in claim 6,
wherein an axis of the hole (12) extends perpendicular to a surface (14) of the workpiece (10), and
wherein the surface (14) is machinable or millable to a planar surface before the detection.

10. The system as claimed in claim 6,
wherein the workpiece (10) is attachable to a holder (20), said holder (20) being configured for being held or clamped in the robot arm (70).

11. The system as claimed in claim 6,
wherein the fixed sensor comprises a camera,
wherein the machine tool (62) comprises the camera (64) in an auxiliary space which is separated from a machining space by means of an openable door, and
wherein the robot arm (70) is configured to hold the workpiece (10) directly adjacent to the door opening and/or to move the workpiece past the doorfor detection of the hole (12).

12. The system as claimed in claim 6,
wherein the robot arm (70) is configured to move the workpiece (10) with the hole (12) in a X-direction straight through an optical axis of the fixed sensor, and in a further step additionally in a direction perpendicular thereto, which direction perpendicular to the X-direction is the Y-direction.

13. The system as claimed in claim 6,
wherein the surface (14) of the workpiece (10) facing the fixed sensor and comprising the hole (12) is aligned orthogonally with respect to an optical axis of the fixed sensor.

14. The system as claimed in claim 6,
wherein the robot arm (70) is configured to hold the workpiece (10) with the hole (12) in the detection range (66) of the fixed sensor and is configured to supply the workpiece (10) to a tool spindle (72) for machining.

15. The system as claimed in claim 6,
wherein the workpiece comprises a milling blank,
wherein said robot arm is movable in at least 3 spatial axes in a range of motion,
wherein said robot arm is configured to carry, guide and move at least one workpiece by a workpiece holder, and
wherein the fixed sensor comprises a spatially fixed optical sensor.

16. The system as claimed in claim 6,
wherein the hole (12) is configured as a through-hole through the workpiece (10) and comprises a cone (16) on at least one side of the workpiece (10).

17. The system as claimed in claim 16,
wherein the hole (12) with a cone-free end is alignable toward the fixed sensor for detection by the fixed sensor.

18. The system as claimed in claim 6,
wherein the workpiece (10) and/or an associated holder (20) comprises a code (52), said code (52) being readable by the fixed sensor configured as a camera (64) when the holder (20) is clamped in the robot arm (70), and
wherein the code (52) is attached to a part of the workpiece (10) to be milled off.

19. The system as claimed in claim 12,
wherein the code (52) of the workpiece (10) detected by the fixed sensor is configured for feeding to the control unit which is configured to select an appropriate machining process for the workpiece (10).

20. The system as claimed in claim 18,
wherein the code (52) comprises a data matrix code.

\* \* \* \* \*